(12) United States Patent
Ku et al.

(10) Patent No.: US 7,973,903 B2
(45) Date of Patent: Jul. 5, 2011

(54) LIQUID CRYSTAL PANEL WITH PROTRUSIONS FOR NARROWING GAP BETWEEN SUBSTRATES THEREOF AND METHOD FOR MANUFACTURING SAME

(75) Inventors: Tsu-Hsien Ku, Miao-Li (TW); Jia-Yi Wu, Miao-Li (TW); Kun-Hsing Hsiao, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 176 days.

(21) Appl. No.: 12/154,831

(22) Filed: May 27, 2008

(65) Prior Publication Data

US 2008/0291383 A1 Nov. 27, 2008

(30) Foreign Application Priority Data

May 25, 2007 (CN) .......................... 2007 1 0074606

(51) Int. Cl.
*G02F 1/1339* (2006.01)

(52) U.S. Cl. ........................................ 349/153; 349/190
(58) Field of Classification Search .......................... None
See application file for complete search history.

(56) References Cited

U.S. PATENT DOCUMENTS

| | | | | |
|---|---|---|---|---|
| 5,619,358 A | * | 4/1997 | Tanaka et al. | 349/143 |
| 6,266,121 B1 | * | 7/2001 | Shigeta et al. | 349/156 |
| 6,862,072 B2 | | 3/2005 | Liu et al. | |
| 7,088,418 B1 | | 8/2006 | Yamashita et al. | |
| 2001/0003476 A1 | * | 6/2001 | Fujioka et al. | 349/138 |
| 2004/0041973 A1 | * | 3/2004 | Lee et al. | 349/153 |
| 2004/0258921 A1 | * | 12/2004 | Watanabe et al. | 428/413 |
| 2005/0094084 A1 | * | 5/2005 | Hsu et al. | 349/153 |
| 2007/0279543 A1 | * | 12/2007 | Park et al. | 349/40 |

FOREIGN PATENT DOCUMENTS

| | | |
|---|---|---|
| CN | 1713056 A | 12/2005 |
| TW | I281579 B | 5/2007 |

* cited by examiner

*Primary Examiner* — Mike Stahl
(74) *Attorney, Agent, or Firm* — Wei Te Chung

(57) ABSTRACT

An exemplary liquid crystal panel includes a first substrate and a second substrate parallel to each other to define a gap therebetween, a sealant disposed around the gap to provide an accommodating space, a liquid crystal layer disposed in the accommodating space, a plurality of signal lines disposed on at least one of the first and second substrates, and a plurality of protrusions at a peripheral side of the liquid crystal layer. The protrusions are configured to narrow the gap thereat. A part of each signal line is disposed between the sealant and the corresponding one of the first and second substrates, and each of the protrusions is arranged between two respective signal lines. A related method for manufacturing a liquid crystal panel is also provided.

18 Claims, 4 Drawing Sheets

LIQUID CRYSTAL PANEL WITH PROTRUSIONS FOR NARROWING GAP BETWEEN SUBSTRATES THEREOF AND METHOD FOR MANUFACTURING SAME

CROSS-REFERENCE TO RELATED APPLICATION

This application is related to, and claims the benefit of, a foreign priority application filed in China as Serial No. 200710074606.X on May 25, 2007. The related application is incorporated herein by reference.

FIELD OF THE INVENTION

The present invention relates to a liquid crystal panel having a plurality of protrusions configured for narrowing a gap between two substrates thereof. The present invention also relates to a method for manufacturing the liquid crystal panel.

GENERAL BACKGROUND

Liquid crystal displays (LCDs) are widely used in various information products, such as notebooks, personal digital assistants, video cameras, and the like. Typically, a liquid crystal panel is configured as one of the essential elements of an LCD.

FIG. 5 is an isometric view a conventional liquid crystal panel. The liquid crystal panel 100 includes a first substrate 110, a second substrate 120, a sealant 140, a driver 160, a plurality of signal lines 170, and a liquid crystal layer (not visible).

The second substrate 120 is parallel to the first substrate 110, and includes an exposed extending portion 122 configured for supporting the driver 160 thereon. The sealant 140 is disposed between a periphery of the first substrate 110 and the second substrate 120, and is configured for attaching the first and the second substrates 110, 120 together. The sealant 140, together with the first and second substrates 110, 120, cooperatively define a closed accommodating space therebetween. The liquid crystal layer is disposed in the accommodating space. A region where the liquid crystal layer is located defines a main central pixel region 150 having a plurality of pixel units (not shown), and a peripheral region (not labeled) surrounding the pixel region 150. The pixel region 150 serves as a display area, and is configured to display images via cooperation of the pixel units thereof.

The signal lines 170 are configured to transmit driving signals provided by the driver 160 to the pixel units of the pixel region 150. The signal lines 170 are typically made of metal such as copper or aluminum, and are disposed on a surface of the second substrate 120 adjacent to the sealant 140. Due to the surrounding of the sealant 140, a part of each signal line 170 is inevitably sandwiched between the sealant 140 and the second substrate 120.

The liquid crystal panel 100 is typically manufactured as follows. Firstly, the signal lines 170 are formed on the second substrate 120. The signal lines 170 extend from the pixel region 150 to the extending portion 122 of the second substrate 120. Secondly, the sealant 140 is formed on the second substrate 120 to provisionally define the accommodating space, and part of the sealant 140 covers the signal lines 170. Thirdly, liquid crystal material is filled into the accommodating spacer, so as to form a precursor of the liquid crystal layer. Fourthly, the first substrate 110 is attached to the second substrate 120 via the sealant 140. Fifthly, the driver 160 is bonded on the extending portion 122, with pins of the driver 160 being electrically coupled to the corresponding signal lines 110.

During the attaching process, the sealant 140 is solidified to ensure strong adhesion between the sealant 140 and the first and second substrates 110, 120. The solidification of the sealant 140 includes a pre-solidifying procedure and a subsequent main solidifying procedure. In the pre-solidifying procedure, ultraviolet (UV) beams are provided to expose the sealant 140, so as to solidify an outer portion of the sealant 140 and increase a rigidity of the sealant 140. In the main solidifying procedure, the sealant 140 is heated, and simultaneously an external pressing force is provided to press the first substrate 110 towards the second substrate 120. Thereby, the sealant 140 is solidified completely, and bonds the first substrate 110 to the second substrate 120.

However, because the signal lines 170 are made of metal, UV beams are incapable of transmitting through the signal lines 170 during the pre-solidifying procedure. Thereby, the solidification of the outer portions of the sealant 140 adjacent to the signal lines 170 may be insufficient after the pre-solidifying procedure. Because the main solidifying procedure usually takes a long period of time, during the main solidifying procedure, the insufficiently solidified portion of the sealant 140 may contaminate the liquid crystal material. Moreover, liquid crystal material may infiltrate into the insufficiently solidified portion of the sealant 140, such that the strength of the adhesion between the sealant 140 and the first and second substrates 110, 120 may be reduced. Therefore, the liquid crystal panel 100 is liable to become damaged and malfunction, particularly if the liquid crystal panel 100 is subjected to shock or vibration during use or transportation.

What is needed is to provide a liquid crystal panel and a method for manufacturing the liquid crystal panel that can overcome the above-described deficiencies.

SUMMARY

In a first aspect, a liquid crystal panel includes a first substrate and a second substrate parallel to each other, a sealant disposed between the first and second substrates to cooperatively define an accommodating space, a liquid crystal layer in the accommodating space, a plurality of signal lines disposed on at least one of the first and second substrates, and a plurality of protrusions in the accommodating space near the sealant. The protrusions extend from at least one of the first and second substrates toward the other one of the first and second substrates. A part of each signal line is disposed between the sealant and the corresponding one of the first and second substrates, and each of the protrusions is arranged between two respective signal lines.

In a second aspect, a method for manufacturing a liquid crystal panel includes: providing a first substrate and a second substrate; forming a plurality of signal lines and a plurality of protrusions on one of the first and second substrates, the protrusions being alternately arranged with the signal lines; forming a sealant to define an accommodating space, a portion of the sealant covering part of the signal lines; putting liquid crystal material in the accommodating space; pre-attaching the first and second substrates together via the sealant; and solidifying the sealant to firmly attach the first and second substrates together.

In a third aspect, a liquid crystal panel includes a first substrate and a second substrate parallel to each other to define a gap therebetween, a sealant disposed around the gap to provide an accommodating space, a liquid crystal layer disposed in the accommodating space, a plurality of signal lines disposed on at least one of the first and second substrates, and a plurality of protrusions at a peripheral side of the liquid crystal layer. The protrusions are configured to narrow the gap thereat. A part of each signal line is disposed between the sealant and the corresponding one of the first and second substrates, and each of the protrusions is arranged between two respective signal lines.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
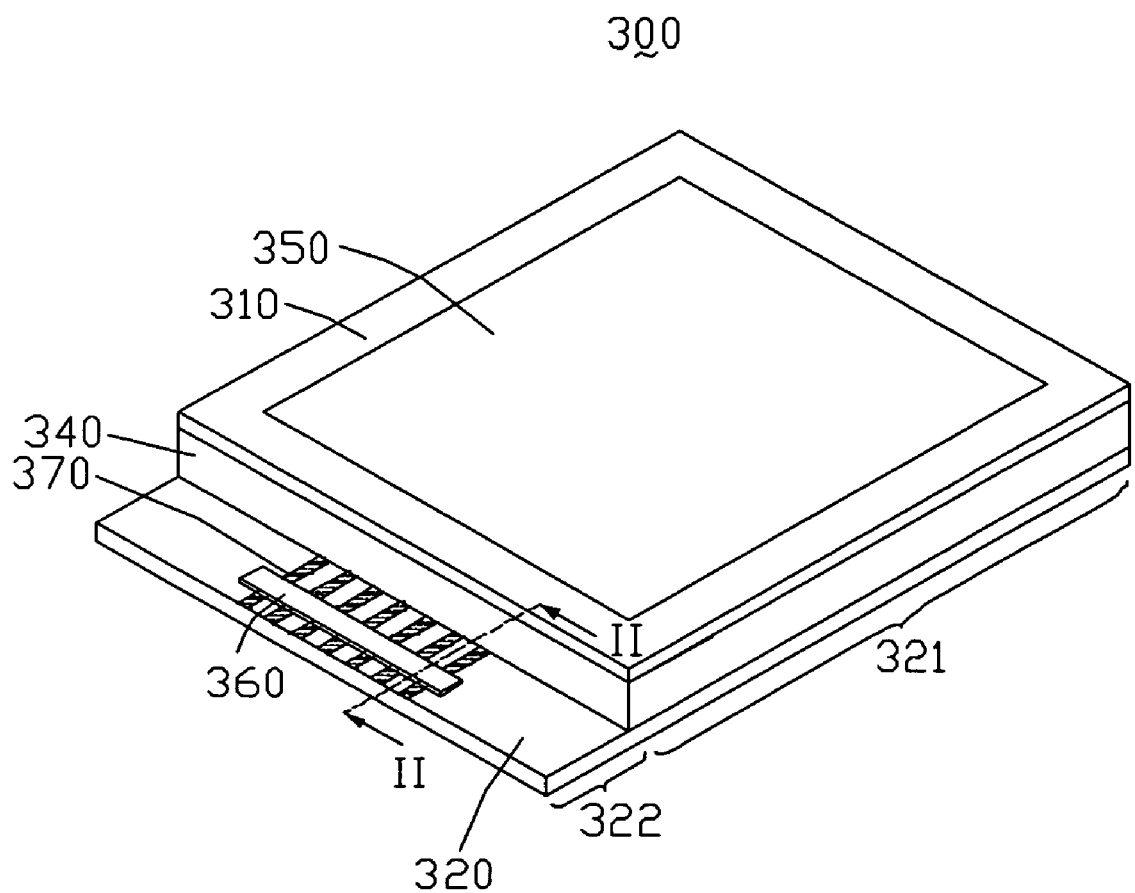
FIG. 1 is an isometric view of a liquid crystal panel according to an exemplary embodiment of the present invention, the liquid crystal panel including a sealant, a plurality of signal lines, and a plurality of protrusions (not visible).
Figure 2:
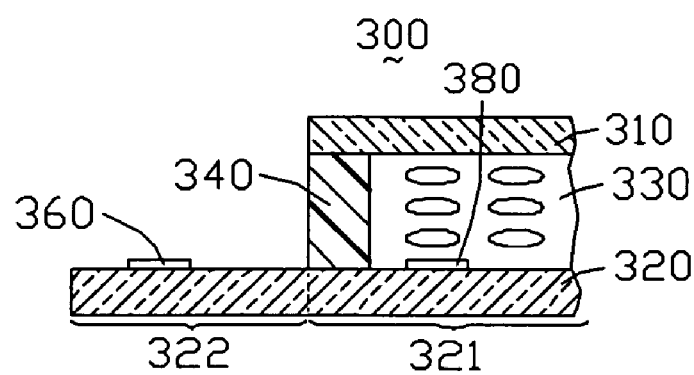
FIG. 2 is a cross-sectional view of part of the liquid crystal panel of FIG. 1, taken along line II-II thereof.

Referring to FIGS. 1-2, a liquid crystal panel 300 includes a first substrate 310, a second substrate 320, a liquid crystal layer 330, a sealant 340, a driver 360, a plurality of signal lines 370, and a plurality of protrusions 380.

The first substrate 310 and the second substrate 320 are flat plate substrates arranged parallel to each other. The first substrate 310 is a color filter substrate. The second substrate 220 is a thin film transistor substrate. The second substrate 220 includes a main portion 321 fully aligned with the first substrate 310, and an exposed extending portion 322. The extending portion 322 is configured for having the driver 360 bonded thereon.

The sealant 340 is disposed between a periphery of the first substrate 310 and the second substrate 320, and is configured for attaching the first substrate 310 and the second substrate 320 together. The sealant 340 together with the first and second substrates 310, 320 cooperatively define a closed accommodating space therebetween. The liquid crystal layer 330 is disposed in the accommodating space. A region where the liquid crystal layer 330 is located defines a main central pixel region 350 having a plurality of pixel units (not shown), and a peripheral region (not labeled) surrounding the pixel region 350. The pixel region 350 serves as a display area, and is configured to display images via cooperation of the pixel units.

The signal lines 370 are configured to transmit driving signals provided by the driver 360 into the pixels of the pixel unit 350. The signal lines 370 are disposed on a surface of the second substrate 120 adjacent to the sealant 340. The signal lines 370 can be made of metal such as copper or aluminum, or any suitable transparent and electrically conductive material such as indium tin oxide (ITO) or indium zinc oxide (IZO). Due to the surrounding of the sealant 340, a portion of each signal line 370 is inevitably sandwiched between the sealant 340 and the second substrate 320.

Figure 3:
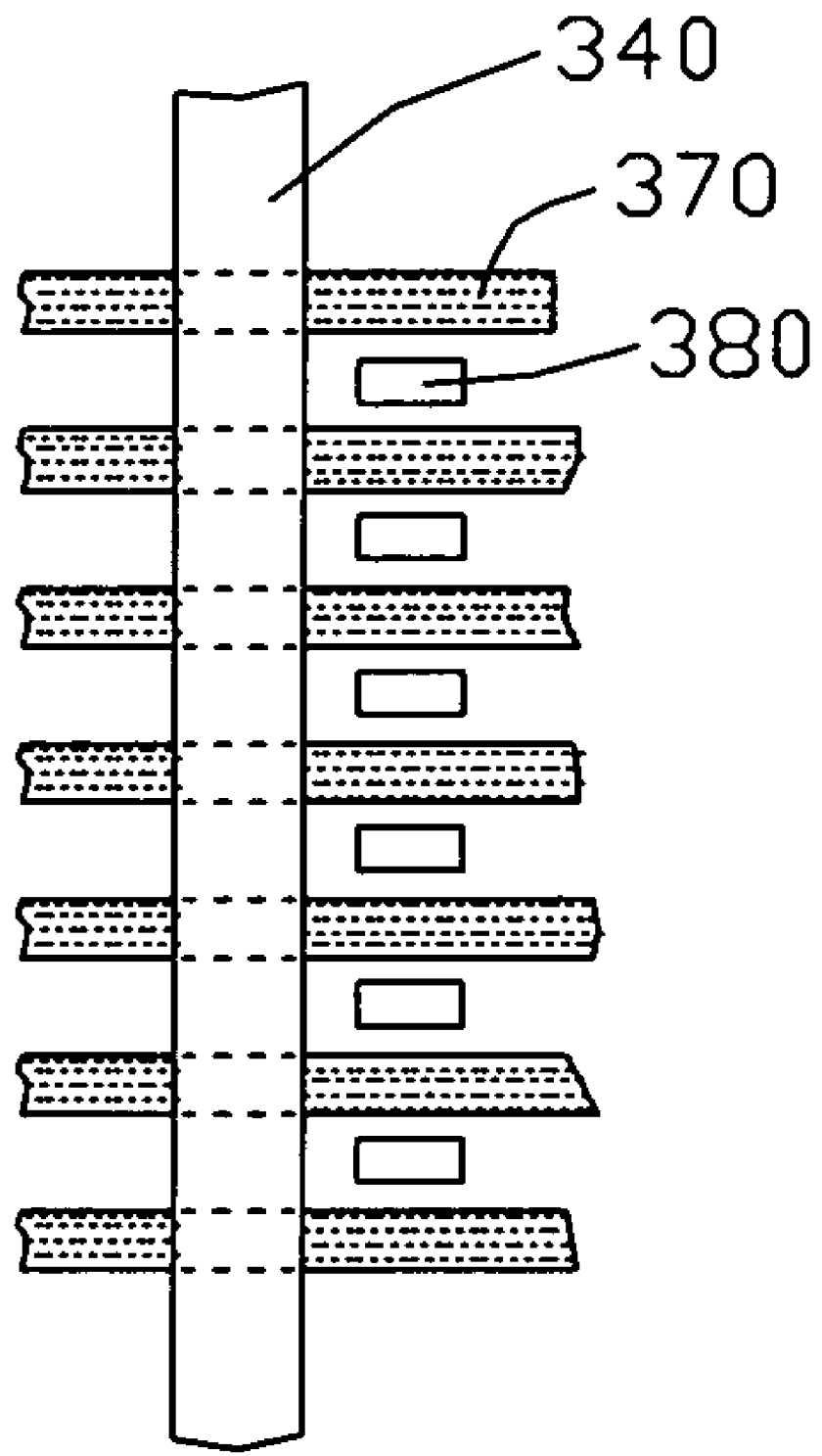
FIG. 3 is an enlarged, top plan view of the protrusions, part of the sealant, and part of the signal lines, showing relative locations thereof.

Referring also to FIG. 3, the protrusions 380 are disposed in the peripheral region adjacent to the portion of the sealant 340 covering the signal lines 370. The protrusions 380 are arranged alternately with the signal lines 370. All the protrusions 380 protrude from the surface of the second substrate 320 towards the first substrate 310, and are immersed in the liquid crystal layer 330. A height of each protrusion 380 is greater than two percent of a thickness of the liquid crystal layer 330. In particular, the height of the protrusion 380 can be in a range from 0.04 micrometers (μm) to 2 μm. Moreover, the protrusion 380 can be made of a selected one of silicon oxide, silicon nitride, ITO, IZO, metal, and resin.

Figure 4:
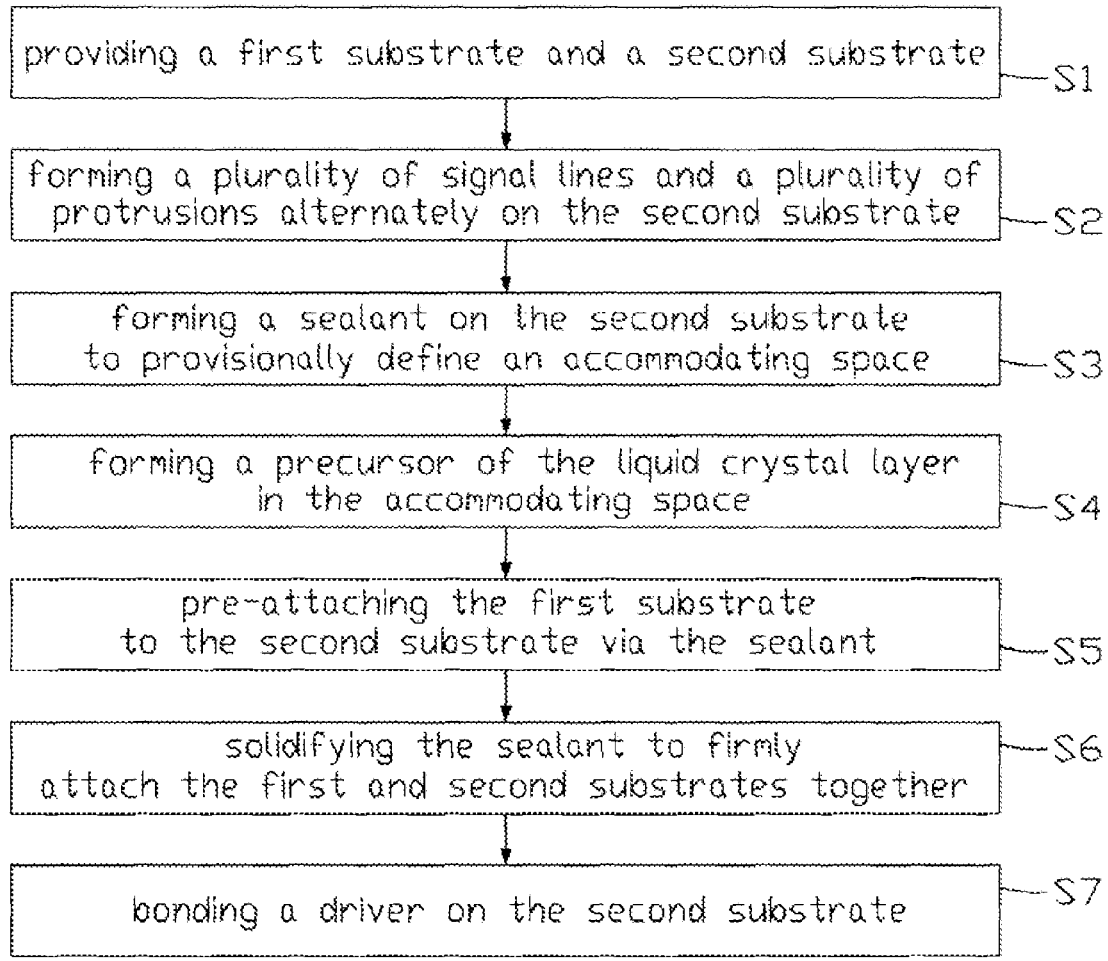
FIG. 4 is a flow chart of an exemplary method for manufacturing the liquid crystal panel of FIG. 1.
Figure 5:
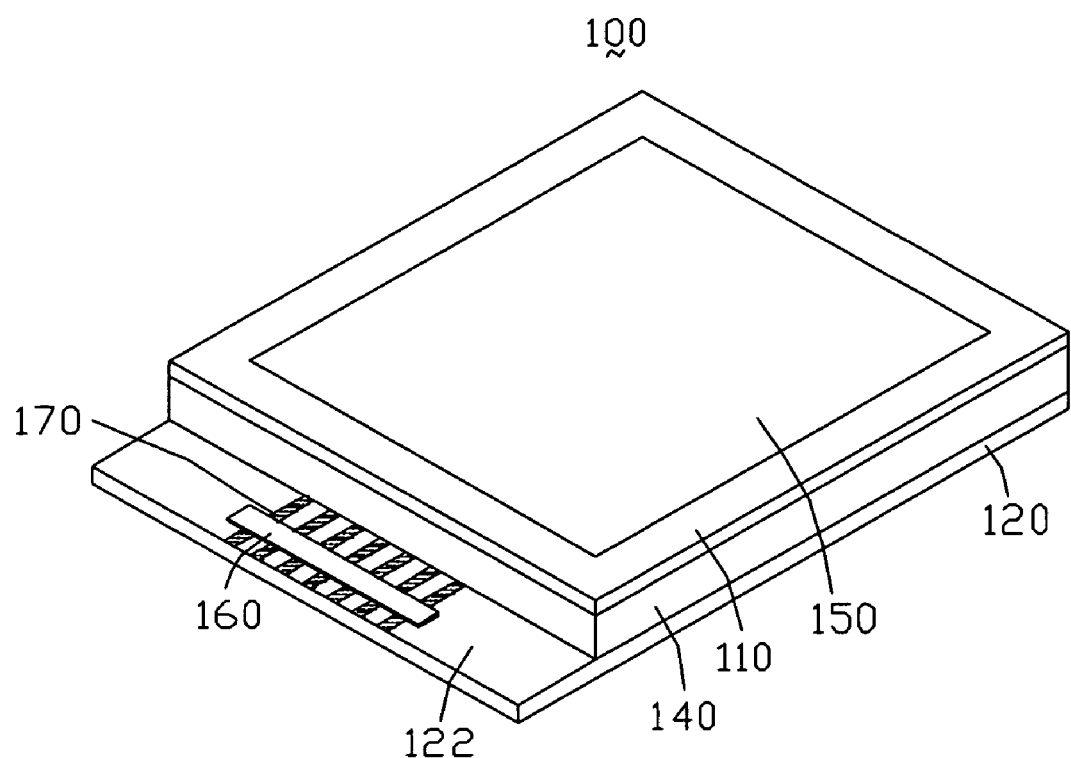
FIG. 5 is an isometric view of a conventional liquid crystal panel.

The liquid crystal panel 300 can be manufactured according to a manufacturing method summarized in FIG. 4. The manufacturing method includes: step S1, providing a first substrate 310 and a second substrate 320; step S2, forming a plurality of signal lines 370 and a plurality of protrusions 380 on the second substrate 320; step S3, forming a sealant 340 on the second substrate 320 to provisionally define an accommodating space; step S4, forming a precursor of the liquid crystal layer 330 in the accommodating space; step S5, pre-attaching the first substrate 310 to the second substrate 320 via the sealant 340; step S6, solidifying the sealant 340 to firmly attach the first and second substrates 310, 320 together; and step S7, bonding a driver 360 on the second substrate 320.

In step S1, the flat plate first substrate 310 and flat plate second substrate 320 are provided. The second substrate 320 includes the main portion 321 and the extending portion 322.

In step S2, firstly, the signal lines 370 are formed on a surface of the second substrate 320, such that the signal lines 370 extend from the main portion 321 to the extending portion 322. Secondly, the protrusions 380 with a height in a range from 0.04 μm to 2 μm are formed alternately with the signal lines 370 on the surface of the second substrate 320. In another embodiment, when the material of the protrusions 380 is the same as that of the signal lines 370, the procedure of forming the protrusions 380 can be merged into that of forming the signal lines 370. That is, the signal lines 370 and the protrusions 380 can be formed simultaneously.

In step S3, the sealant 340 is coated around a periphery of the main portion 321 of the second substrate 320, with a portion of the sealant 340 covering the signal lines 370. Thereby, a provisional accommodating space is cooperatively defined by the sealant 340 and the second substrate 320, with the protrusions 380 being located inside the provisional accommodating space.

In step S4, liquid crystal material is filled into a main central region of the accommodating space via a so-called one drop fill (ODF) technology, such that a precursor of the liquid crystal layer 330 is formed. In particular, the dropping of liquid crystal material need to be accurately controlled, so as to prevent the liquid crystal layer 330 from contacting the sealant 340.

In step S5, the first substrate 310 is aligned with the main portion 321 of the second substrate 320, and then is pre-attached to the second substrate 320 via the sealant 340. Thereby, the provisional accommodating space is closed, and the liquid crystal material of the liquid crystal layer 330 starts to flow towards the sealant 340 under the pressure of the first substrate 310.

Once the first substrate 310 is pre-attached to the second substrate 320, the solidifying process of the sealant 340 (i.e. step S6) is immediately started. In step S6, the sealant 340 is solidified via a pre-solidifying procedure and a subsequent main solidifying procedure.

In the pre-solidifying procedure, UV beams are provided to expose the sealant 340, so as to solidify an outer portion of the sealant 340 and increase a rigidity of the sealant 340. In particular, the sealant 340 is exposed by the UV beams for a period of time lasting about 30 seconds. Due to the signal lines 370, the UV beams may be incapable of reaching portions of the sealant 340 adjacent to the signal lines 370, and solidification of these portions of the sealant 140 may be insufficient.

In the main solidifying procedure, the sealant 340 is heated for about 30~60 minutes. During the heating procedure, an external pressing force is provided to press the first substrate 310 towards the second substrate 320. The whole sealant 340, including the portions thereof adjacent to the signal lines 370, is thereby completely solidified, such that the first substrate 310 is firmly attached to the second substrate 320 via the sealant 340.

In addition, during the solidification of the sealant 340, particularly the main solidifying procedure in step S6, the liquid crystal material of the liquid crystal layer 330 flows toward the sealant 340 gradually. A gap between the first and second substrates 310, 320 is narrowed in the regions where the protrusions 380 are located. Thereby, a so-called capillary phenomenon in such regions is increased. In particular, the protrusions 380 serve as flow guiding elements, and guide the liquid crystal material to firstly flow to the regions where the protrusions 380 are located. Accordingly, the liquid crystal material slowly diffuses towards the insufficiently solidified portions of the sealant 340 later on.

In step S7, the driver 360 is bonded on the extending portion 322 of the second substrate 320, such that pins of the driver 360 are electrically coupled to the signal lines 370.

In summary, the liquid crystal panel 300 has the plurality of protrusions 380 alternately arranged with the signal lines 370. The capillary phenomenon in the regions where the protrusions 380 are located is increased. The increased capillary phenomenon means the liquid crystal material firstly flows to said regions, and subsequently diffuses towards the insufficiently solidified portions of the sealant 340. That is, the liquid crystal material is delayed for a certain period of time before contacting the insufficiently solidified portions of the sealant 340. Such portions of the sealant 340 can typically be completely solidified prior to the arrival of the liquid crystal material. The possibility of the liquid crystal material contacting the insufficiently solidified portions of the sealant 340 is reduced or even eliminated. Accordingly, contamination of the liquid crystal material by such portions of the sealant 340 are avoided or even prevented altogether.

Moreover, the protrusions 380 also physically block to some extent infiltration of the liquid crystal material into the insufficiently solidified portions of the sealant 340. Thus the strength of the adhesion between the sealant 340 and the first and second substrates 310, 320 can be improved. Accordingly, the reliability of the liquid crystal panel 300 is enhanced.

In one alternative embodiment, in order to narrow the gap between the first substrate 310 and the second substrate 320 in the regions between every two adjacent signals lines 370, the protrusions 380 can be formed on corresponding regions of the first substrate 310 instead of being formed on the second substrate 320. In another alternative embodiment, the protrusions 380 can be formed on both the first and second substrates 310, 320.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of shape, size and arrangement of parts) within the principles of the invention to the full extent indicated by the broad general meaning of the terms in which the appended claims are expressed.

What is claimed is:

1. A liquid crystal panel, comprising:
    a first substrate and a second substrate parallel to each other;
    a sealant disposed between the first and second substrates to cooperatively define an accommodating space;
    a liquid crystal layer in the accommodating space;
    a plurality of signal lines disposed on the second substrate; and
    a plurality of protrusions each located entirely within the accommodating space near the sealant, the protrusions extending from the second substrate toward the first substrate;
    wherein a part of each signal line is disposed between the sealant and the second substrate, and each of the protrusions is arranged between two respective signal lines,
    wherein a gap is located between each protrusion and the first substrate, and the gap is filled with the liquid crystal layer.

2. The liquid crystal panel of claim 1, wherein a height of each protrusion is at least two percent of a thickness of the liquid crystal layer.

3. The liquid crystal panel of claim 1, wherein a height of each protrusion is in a range from 0.04 μm to 2 μm.

4. The liquid crystal panel of claim 1, wherein the protrusions are made of at least one item selected from the group consisting of silicon oxide, silicon nitride, indium tin oxide, indium zinc oxide, metal, and resin.

5. The liquid crystal panel of claim 1, wherein a material of the protrusions is the same as that of the signal lines.

6. The liquid crystal panel of claim 1, wherein a region where the liquid crystal layer is located defines a main central pixel region and a peripheral region, the peripheral region is located at the outmost periphery of the liquid crystal layer, and the protrusions are located at the peripheral region.

7. The liquid crystal panel of claim 6, wherein the second substrate includes a main portion aligned with the first substrate, and an exposed extending portion, and the signal lines covered by the sealant extend to the extending portion of the second substrate.

8. The liquid crystal panel of claim 7, further comprising a driver disposed on the extending portion of the second substrate, the driver configured to provide driving signals to drive the pixel region.

9. The liquid crystal panel of claim 1, wherein the protrusions are configured to enhance capillary phenomenon of regions where the protrusions are located.

10. The liquid crystal panel of claim 1, wherein the protrusions are spaced from the sealant.

11. The liquid crystal panel of claim 1, wherein a length of each protrusion is less than half a length of each of the signal lines.

12. A method for manufacturing a liquid crystal panel, the method comprising:
    providing a first substrate and a second substrate;
    forming a plurality of signal lines and a plurality of protrusions on the second substrate, the protrusions being alternately arranged with the signal lines;

forming a sealant to define an accommodating space, a portion of the sealant covering part of the signal lines;

putting liquid crystal material in the accommodating space;

pre-attaching the first and second substrates together via the sealant, whereby each of the protrusions is entirely within the accommodating space near the sealant; and solidifying the sealant to firmly attach the first and second substrates together, wherein a gap is located between each protrusion and the first substrate, and the gap is filled with the liquid crystal layer.

13. The method of claim 12, wherein the second substrate includes a main portion and an extending portion, and the signal lines extend from the extending portion to the main portion.

14. The method of claim 13, further comprising: providing a driver; and bonding the driver on the extending portion of the second substrate such that the driver is electrically coupled to the signal lines.

15. The method of claim 13, wherein the sealant is formed at a periphery of the main portion of the second substrate, and the protrusions are located in the accommodating space.

16. The method of claim 12, wherein a region where the liquid crystal layer is located defines a main central pixel region and a peripheral region, the peripheral region is located at the outmost periphery of the liquid crystal layer, and the protrusions are located at the peripheral region.

17. A liquid crystal panel, comprising:
a first substrate and a second substrate parallel to each other and defining a gap therebetween;
a sealant disposed around the gap to provide an accommodating space;
a liquid crystal layer in the accommodating space;
a plurality of signal lines disposed on one of the first and second substrates; and
a plurality of protrusions at a peripheral side of the liquid crystal layer, the protrusions configured to narrow the gap thereat;
wherein a part of each signal line is disposed between the sealant and the one of the first and second substrates, each of the protrusions is located entirely within the accommodating space near the sealant, and is arranged between two respective signal lines,
wherein a sub-gap is located between each protrusion and the first substrate, and the sub-gap is filled with the liquid crystal layer.

18. The liquid crystal panel of claim 17, wherein a length of each protrusion is less than half a length of each of the signal lines.

* * * * *